US006982290B2

(12) United States Patent
Nakano

(10) Patent No.: US 6,982,290 B2
(45) Date of Patent: Jan. 3, 2006

(54) INK SET

(75) Inventor: Yukihiro Nakano, Wakayama (JP)

(73) Assignee: Kao Corporation, Tokyo (JP)

( * ) Notice: Subject to any disclaimer, the term of this patent is extended or adjusted under 35 U.S.C. 154(b) by 179 days.

(21) Appl. No.: 10/314,223

(22) Filed: Dec. 9, 2002

(65) Prior Publication Data

US 2003/0125415 A1    Jul. 3, 2003

(30) Foreign Application Priority Data

Dec. 12, 2001   (JP) .............................. 2001-378393

(51) Int. Cl.
  *C09D 11/10* (2006.01)
  *C08K 9/00* (2006.01)
  *C08K 9/10* (2006.01)

(52) U.S. Cl. ...................... 523/160; 523/205

(58) Field of Classification Search ................ 523/160, 523/161, 200, 205; 106/31.27, 31.28, 31.6
See application file for complete search history.

(56) References Cited

U.S. PATENT DOCUMENTS

| | | | |
|---|---|---|---|
| 5,852,074 A * | 12/1998 | Tsutsumi et al. ............ 523/161 |
| 6,399,674 B1 * | 6/2002 | Kashiwazaki et al. ....... 523/161 |
| 6,488,751 B1 * | 12/2002 | Takemoto ................. 106/31.13 |
| 6,547,382 B1 * | 4/2003 | Shirota et al. .............. 347/100 |
| 6,682,590 B2 * | 1/2004 | Omatsu et al. ............. 106/31.5 |
| 6,713,528 B2 * | 3/2004 | Yamanouchi et al. ....... 523/160 |
| 6,713,531 B2 * | 3/2004 | Iijima ......................... 523/160 |
| 6,733,120 B2 * | 5/2004 | Ogasawara et al. ......... 347/100 |
| 6,746,114 B2 * | 6/2004 | Takahashi et al. .......... 347/100 |
| 2001/0023265 A1 * | 9/2001 | Hidaka et al. .............. 523/161 |
| 2003/0160850 A1 * | 8/2003 | Ohya et al. ................. 347/101 |

FOREIGN PATENT DOCUMENTS

| | | |
|---|---|---|
| EP | 1 153 991 | 11/2001 |
| EP | 1 308 486 | 5/2003 |
| JP | 09-183224 | 7/1997 |
| JP | 10-140064 | 5/1998 |
| JP | 2001187853 A * | 7/2001 |

OTHER PUBLICATIONS

Machine Translation of JP 2001-187853 A (2001).*
Patent Abstracts of Japan, 08-080665.
Patent Abstracts of Japan, 2001-254038.
Patent Abstracts of Japan, 2003-034070.

* cited by examiner

*Primary Examiner*—Callie Shosho
(74) *Attorney, Agent, or Firm*—Oblon, Spivak, McClelland, Maier & Neustadt, P.C.

(57) ABSTRACT

An ink set comprising at least two color inks containing water-insoluble colorants for color inks having a different color with each other, wherein the ink set has at least one combination of two color inks satisfying that the difference in the average particle diameter of the particles contained in the colorant between these two color inks is at least 55 nm. The ink set can be suitably used for printers for inkjet printing.

18 Claims, No Drawings

INK SET

BACKGROUND OF THE INVENTION

1. Field of the Invention

The present invention relates to an ink set, and more specifically to an ink set which can be suitably used for printers for inkjet recording.

2. Discussion of the Related Art

Inkjet recording is a recording system for forming characters or images, comprising directly jetting ink droplets from very fine nozzles to a recording medium, and depositing the ink droplets on the recording medium. This system has some advantages such that not only the device shows excellent operability at a low level of noise, but also the coloration is facilitated and plain paper can be used as a recording medium. Therefore, this system has been widely used in recent years.

In the inkjet recording, there have been recently used an ink set comprising inks having different colors with each other, such as black ink, yellow ink, cyan ink and magenta ink. However, bleeding has been sometimes generated at the boundaries between their inks at their contacted portions (hereinafter simply referred to as bleeding) when the inks having different colors are contacted with each other on a recording member before drying.

As ink sets in which bleeding is controlled, there have been proposed an ink set comprising an acidic black ink comprising an acidic carbon black, a basic surfactant and a water-soluble organic solvent, and a basic color ink (Japanese Patent Laid-Open No. Hei 9-183224); an ink set comprising a black ink containing a self-dispersible carbon black in which a hydrophilic group is bonded directly or via other atomic group to the surface of the carbon black, and a color ink containing a colorant having a reverse polarity to a colorant of the black ink (Japanese Patent Laid-Open No. Hei 10-140064); and the like.

However, when these ink sets are used, while the printout shows excellent bleeding resistance (difficulty in generation of bleeding, hereinafter referred to the same), there arise some defects such that the inks are aggregated by the contact of these inks with each other on the face or in the jetting outlet for the inks of the printer during inkjetting or cleaning of the printer head, so that nozzle clogging is caused, that jetting failure of the inks is caused, and that the linear jetting of the inks is inhibited, whereby crookedness (distortion) is generated.

Therefore, in order to eliminate these defects, it has been investigated to develop the jetting of inks having different ionicity with each other from separate heads. However, when this means is employed, there is a defect such that costs for producing an apparatus for this means highly increase because an apparatus used for this means should be compulsively large-scaled and becomes complicated.

An object of the present invention is to provide an ink set excellent in bleeding resistance, water resistance and rubbing resistance. Another object of the present invention is to provide an ink set which can be suitably used for inkjet recording, and which exhibits excellent jetting property, without changing the printer head in accordance with the kinds of the inks.

These and other objects of the present invention will be apparent from the following description.

SUMMARY OF THE INVENTION

According to the present invention, there is provided an ink set comprising at least two color inks containing water-insoluble colorants for color inks having a different color with each other, wherein the ink set has at least one combination of two color inks satisfying that the difference in the average particle diameter of the particles contained in the colorant between these two color inks is at least 55 nm.

DETAILED DESCRIPTION OF THE INVENTION

The "color ink" as used herein refers to an ink other than a black ink. The color ink includes a yellow ink, a cyan ink and a magenta ink.

The ink set of the present invention comprises plural color inks having different colors with each other, and may contain a black ink.

The "different colors," as used herein, refers to colors in which at least one value of a*, b* and L* of an ink is not equal to that of another ink when the color difference is represented by the CIELAB which is determined by measuring the reflected light of a printout at a wave length of light of D65/2 using NIPPON DENSHOKU Spectro Color Meter SE 2000 commercially available from Nippon Denshoku Kogyo K.K.

In addition, the "lightness" as used herein refers to a value represented by L*.

The water-insoluble colorant (hereinafter simply referred to as "colorant") comprises a water-insoluble colorant for a black ink and a water-insoluble colorant for a color ink.

In the present invention, one of the major characteristics resides in that the ink set has at least one combination of two color inks satisfying that the difference in the average particle diameter of the particles contained in the colorant between these two color inks is at least 55 nm.

Since the ink set of the present invention has the above characteristics, the ink set is excellent in bleeding resistance. The reason why the above-mentioned excellent bleeding resistance is exhibited is thought to be based upon the following reasons.

When an ink having a certain color is contacted with another ink having a color different from the above ink, the particles having a smaller particle diameter contained in one colorant are diffused and adsorbed to the particles having a larger particle diameter contained in another colorant, so that both particles are aggregated. Since the mobility (Brownian movement) of the aggregated particles having an increased particle diameter is lowered due to the aggregation, and the particles are easily deposited on a recording member, it is thought that the diffusion of one ink to another ink is inhibited, and thereby the bleeding is suppressed.

When at least two kinds of inks containing colorants having different average particle diameters with each other are used, and these inks are contacted with each other by jetting the inks from a printer head or by cleaning a printer head, it is thought that aggregated particles are generated.

However, since the aggregation force of these colorants is actually weaker than that of conventional colorants having different ionicity with each other, jetting failure of inks due to nozzle clogging, or distortion of printouts would not be generated.

Accordingly, the ink set of the present invention can be suitably used as an ink set for inkjet recording.

The "difference in average particle diameters of the particles contained in a colorant" means an absolute value of the difference between the average particle diameter of particles contained in a colorant having the largest average particle diameter and the average particle diameter of particles contained in a colorant having the smallest average particle diameter. This difference is obtained by the following procedures. The average particle diameter of particles contained in each water-insoluble colorant of a color ink used in an ink set, such as a yellow ink or a magenta ink is measured. A colorant having the largest average particle diameter and a colorant having the smallest average particle diameter in the colorants are determined. Then, the absolute value of the difference between the largest average particle diameter and the smallest average particle diameter is calculated.

The water-insoluble colorant used in a black ink is excluded from the objects for obtaining the difference in average particle diameters of the particles contained in a colorant.

For instance, as to an ink set composed of a black ink, a yellow ink, a magenta ink and a cyan ink, if each average particle diameter of the particles contained in the water-insoluble colorant used in each ink is 100 nm for the black ink, 80 nm for the yellow ink, 120 nm for the magenta ink and 140 nm for the cyan ink, respectively, the difference in average particle diameters of the particles contained in a colorant is 60 nm. This difference is obtained by calculating the absolute value of the difference between the largest particle diameter of 140 nm which is the average particle diameter in the cyan ink and the smallest average particle diameter of 80 nm which is the average particle diameter in the yellow ink, with the exclusion of the average particle diameter in the black ink from the calculation.

So long as the object of the present invention is not impaired, the ink may contain particles not having a particle diameter satisfying the above difference in average particle diameters, which are contained in a water-insoluble colorant.

The average particle diameter of the polymer particles is determined by cumulant analysis using a particle size distribution analyzer commercially available from Otsuka Denshi K.K. under the trade name of ELS-8000, as described in the examples mentioned later.

In the present invention, the larger the difference in average particle diameters of the particles contained in a colorant is, the more excellent the bleeding resistance becomes. Therefore, the difference in average particle diameters of the particles contained in a colorant is at least 55 nm, preferably at least 58 nm, more preferably at least 60 nm, still more preferably at least 63 nm, most preferably at least 70 nm. Also, in order to make the difference in average particle diameter larger, particles having a larger particle diameter could be used. However, the larger the average particle diameter is, the more the dispersion stability is impaired. From this viewpoint, the difference in average particle diameters of the particles contained in a colorant is preferably at most 200 nm, more preferably at most 150 nm, still more preferably at most 130 nm, especially preferably at most 100 nm. From these viewpoints, the difference in average particle diameters of the particles contained in a colorant is at least 55 nm, preferably 58 to 200 nm, more preferably 60 to 150 nm, still more preferably 60 to 130 nm, especially preferably 63 to 100 nm, most preferably 70 to 100 nm.

It is desired that the combination number of two colorants satisfying the difference in average particle diameters of the particles (hereinafter simply referred to as "combination number of the colorants") is larger from the viewpoint of reducing the combination number of inks which would cause bleeding. Therefore, the combination number of the colorants is at least 1, preferably at least 2, more preferably at least 3. The upper limit of the combination number of the colorants is determined depending upon the number of colors used in the ink set. Therefore, the combination number of colorants is to be its upper limit. It is most preferable that the combination number of the colorants is usually the above-mentioned upper limit from the viewpoint of exclusion of the combination of colors which would cause bleeding. For instance, if the number of the colors is 2, 3 or 4, then the above-mentioned upper limit is 1, 3 or 6, respectively.

There are some cases where bleeding is not conspicuous or hardly noticeable in a combination of colors nevertheless the bleeding is actually generated. For instance, when an ink having a low lightness, such as a cyan ink is diffused into an ink having a high lightness, such as yellow ink, the yellow color is partly changed to a slightly yellowish cyan color, making the printout more blurry. To the contrary, when a yellow ink is diffused into a cyan ink, the cyan color remains unchanged, or the optical density of the mixed colors is somewhat lowered than the original optical density of the cyan ink.

In the case where the average particle diameter of the particles contained in a colorant to be included in an ink having a lower lightness is larger than the average particle diameter of the particles contained in a colorant to be included in an ink having a higher lightness, since the particles contained in a colorant to be included in the ink having a higher lightness are diffused to the particles contained in a colorant to be included in the ink having a lower lightness, the bleeding becomes less noticeable.

Accordingly, it is preferable that the combination number of colorants in which the average particle diameter of the particles contained in a colorant of an ink having a lower lightness is larger than the average particle diameter of the particles contained in a colorant of an ink having a higher lightness (hereinafter referred to as "combination number of lightness") is at least 1 from the viewpoint that blur is easily noticeable. Since a yellow ink generally has a high lightness, it is preferable that the average particle diameter of the particles contained in a colorant of a yellow ink is smallest in the average particle diameters of the particles contained in all of the colorants of the ink set.

Incidentally, it is desired that the average particle diameter of the particles contained in a colorant is 10 to 200 nm, preferably 30 to 180 nm, more preferably 50 to 150 nm, still more preferably 70 to 130 nm, from the viewpoint of improving the dispersion stability and prevention of nozzle clogging, and from the viewpoint of increasing the optical density.

The water-insoluble colorant includes:

(A) a dispersion prepared by dispersing a pigment in water with a surfactant, a pigment derivative or a water-soluble polymer (hereinafter referred to as "pigment dispersion");

(B) a self-dispersible pigment in which a hydrophilic group is bonded to a pigment directly or via another atomic group;

(C) an aqueous dispersion of water-insoluble polymer particles containing a pigment or a hydrophobic dye;

and the like.

Among the colorants, the aqueous dispersion of water-insoluble polymer particles containing a pigment or a hydrophobic dye is preferable, from the viewpoints of water resistance, rubbing resistance and high-lighter fastness.

The pigment used in the pigment dispersion can be any of an inorganic pigment and an organic pigment. The pigment can be used together with an extender as occasion demands.

The inorganic pigment includes carbon black, metal oxides, metal sulfides and the like.

In the case of the colorant for a black ink, the pigment is preferably a black pigment such as carbon black. The carbon black includes furnace black, thermal lamp black, acetylene black, channel black and the like.

In the case of the colorant for a color ink, the pigment is preferably a colored pigment such as an organic pigment or an extender. The organic pigment includes azo pigments, diazo pigments, phthalocyanine pigments, quinacridone pigments, isoindolinone pigments, dioxazine pigments, perylene pigments, perinone pigments, thioindigo pigments, anthraquinone pigments, quinophthalone pigments and the like.

The extender includes silica, calcium carbonate, talc and the like.

As to the above-mentioned pigment dispersion (A), the pigment is dispersed in water with a surfactant, a pigment derivative or a water-soluble polymer.

The surfactant includes anionic surfactants, cationic surfactants, nonionic surfactants and amphoteric surfactants. Among them, a sodium salt of a condensate of β-naphthalenesulfonic acid and formaldehyde (for instance, those commercially available from Kao Corporation under the trade names of Demol N, Demol RN, Demol MS and the like); and carboxylic acid-based polymer surfactants (for instance, those commercially available from Kao Corporation under the trade names of Poise 520, Poise 521, Poise 530 and the like) are preferable from the viewpoints of dispersion stability and jetting property.

It is desired that the amount of the surfactant is 1 to 120 parts by weight, preferably 3 to 70 parts by weight, more preferably 5 to 30 parts by weight, based on 100 parts by weight of the pigment, from the viewpoints of dispersion stability of the colorant in the ink and jetting property of the ink.

The pigment derivative includes azo derivatives, diazo derivatives, phthalocyanine derivatives, quinacridone derivatives, isoindolinone derivatives, dioxazine derivatives, perylene derivatives, perinone derivatives, thioindigo derivatives, anthraquinone derivatives and quinophthalone derivatives, which have an ionic functional group or a salt of an ionic functional group.

The water-soluble polymer used for dispersing a pigment in water includes water-soluble vinyl polymers, water-soluble ester polymers, water-soluble urethane polymers, and the like. Among these polymers, the water-soluble vinyl polymers are preferable.

The "water-soluble polymer" as used herein means a polymer which dissolves in 100 g of water in an amount of at least 1 g at 25° C. after neutralization. Also, the "water-insoluble polymer" as used herein refers to a polymer other than the above-mentioned water-soluble polymer.

The water-soluble vinyl polymers include a copolymer prepared by polymerizing a monomer composition comprising a monomer having a salt-forming group (a) and a hydrophobic monomer (b). This monomer composition may contain a nonionic hydrophilic monomer (c) as occasion demands.

The monomer having a salt-forming group (a) includes anionic monomers and cationic monomers.

Examples of the anionic monomer include unsaturated carboxylic acid monomers, unsaturated sulfonic acid monomers, unsaturated phosphoric acid monomers, and the like. Among them, the unsaturated carboxylic acid monomers are preferable, and acrylic acid and methacrylic acid are more preferable.

Examples of the cationic monomer include tertiary amine-containing unsaturated monomers, ammonium salt-containing unsaturated monomers, and the like.

Concrete examples of the cationic monomer include N,N-dimethylaminoethyl (meth)acrylate, N-(N',N'-dimethylaminopropyl) (meth)acrylamide, vinylpyrrolidone, methacryloyloxyethyltrimethylammoniummethyl sulfate, methacryloyloxyethyldimethylethylammoniumethyl sulfate, and the like. Among them, N,N-dimethylaminoethyl (meth)acrylate is preferable.

The hydrophobic monomer (b) includes, for instance, (meth)acrylates such as methyl (meth)acrylate, ethyl (meth)acrylate, (iso)propyl (meth)acrylate, (iso or tertiary)butyl (meth)acrylate, (iso)amyl (meth)acrylate, cyclohexyl (meth)acrylate, benzyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate; styrenic monomers such as styrene, vinyltoluene, 2-methylstyrene and chlorostyrene; and the like. These monomers can be used alone or in admixture of at least two kinds.

Incidentally, the above-mentioned "(iso or tertiary)" and "(iso)" include both of the case where these groups are present and the case where these groups are absent. When these groups are absent, the monomer is in the form of normal.

The nonionic hydrophilic monomer (c) includes 2-hydroxyethyl (meth)acrylate, 3-hydroxypropyl (meth)acrylate, polyethylene glycol (n=2–30) (meth)acrylates, poly(ethylene glycol (n=1–15)/propylene glycol (n=1–15)) (meth)acrylates; C1–12 monoalkoxypolyethylene glycol (n=2–30) (meth)acrylates, and the like. Among them, 2-hydroxyethyl (meth)acrylate and C1–12 monoalkoxypolyethylene glycol (n=2–30) (meth)acrylates are preferable.

The ratio of the monomer having a salt-forming group (a), the hydrophobic monomer (b) and the nonionic hydrophilic monomer (c) is not limited to specified ones, as long as these monomers are water-soluble after neutralization, and an obtained ink is excellent in dispersion stability of colorant and jetting property. It is preferable that the ratio of the monomer having a salt-forming group (a)/hydrophobic monomer (b)/nonionic hydrophilic monomer (c) (weight ratio) is usually 5–80/20–85/0–75, and that the total amount of the monomer having a salt-forming group (a) and the nonionic hydrophilic monomer (c) is 15 to 80% by weight. It is more preferable that the ratio of the monomer having a salt-forming group (a)/hydrophobic monomer (b)/nonionic hydrophilic monomer (c) (weight ratio) is 10–70/30–70/0–60, and that the total amount of the monomer having a salt-forming group (a) and the nonionic hydrophilic monomer (c) is 30 to 60% by weight.

The weight-average molecular weight of the water-soluble polymer is preferably 500 to 30000, more preferably 800 to 20000, still more preferably 1000 to 10000 in consideration of dispersion stability of the colorant in the ink and ink viscosity. The weight-average molecular weight of the water-soluble polymer is a value prior to neutralization as determined by gel chromatography described in the examples shown below.

It is preferable that the water-soluble polymer is neutralized. The neutralization degree is not limited to specified ones, as long as the dispersion stability of the pigment dispersion can be sufficiently maintained. It is preferable that the neutralizing agent is usually added in an amount of 0.3 to 2 mol per 1 mol of the salt-forming group of the monomer having a salt-forming group, which constitutes the water-soluble polymer.

The neutralizing agent used for neutralization may be appropriately selected depending upon the kind of the salt-forming group of the water-soluble polymer. For instance, when a cationic monomer is used in the water-soluble polymer, there can be used acetic acid, methoxyacetic acid, propionic acid, lactic acid, succinic acid, glycollic acid, gluconic acid, glyceric acid or the like as the neutralizing agent. Also, when an anionic monomer is used as the water-soluble polymer, there can be used a tertiary amine such as trimethylamine or triethylamine, sodium hydroxide, potassium hydroxide, lithium hydroxide, ammonia or the like as the neutralizing agent.

It is desired that the amount of the pigment derivative or the water-soluble polymer is 5 to 100 parts by weight, preferably 10 to 80 parts by weight, more preferably 15 to 60 parts by weight, based on 100 parts by weight of the pigment, from the viewpoints of dispersion stability of the colorant in the ink and jetting property of the ink.

The above-mentioned self-dispersible pigment (B) in which a hydrophilic group is bonded to the pigment directly or via an atomic group, includes self-dispersible pigments as disclosed in Japanese Patent Laid-Open Nos. Hei 10–140064, Hei 10–110127 and the like. Concrete examples of the self-dispersible pigment include a pigment commercially available from Cabot Corporation under the trade name of CAB-O-JET (registered trademark) 300.

The pigment used in the above-mentioned aqueous dispersion (C) of the water-insoluble polymer particles containing a pigment or a hydrophobic dye can be the same as those used in the above-mentioned pigment dispersion.

Examples of the hydrophobic dye include oil-soluble dyes, disperse dyes and the like. Among them, oil-soluble dyes and disperse dyes are preferable because they can be satisfactorily contained in the polymer particles.

The oil-soluble dyes are not limited to specified ones, and include, for instance, C.I. Solvent Black 3, 7, 27, 29 and 34; C.I. Solvent Yellow 14, 16, 29, 56 and 82; C.I. Solvent Red 1, 3, 8, 18, 24, 27, 43, 51, 72 and 73; C.I. Solvent Violet 3; C.I. Solvent Blue 2, 11 and 70; C.I. Solvent Green 3 and 7; C.I. Solvent Orange 2; and the like.

The disperse dyes are not limited to specified ones. Preferable examples of the disperse dye include C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; C.I. Disperse Green 6:1 and 9; and the like.

It is desired that the hydrophobic dye is one which dissolves in an organic solvent used for dissolving the water-soluble polymer for the preparation of the aqueous dispersion in an amount of at least 2 g/L, preferably 20 to 500 g/L at 25° C. from the viewpoint of efficiently containing the hydrophobic dye in the water-insoluble polymer particles.

The water-insoluble polymer is used for containing a pigment or dye in the water-insoluble polymer particles.

The water-insoluble polymer includes water-insoluble vinyl polymers, water-insoluble ester-based polymers, water-insoluble urethane-based polymers, and the like. Among these polymers, the water-insoluble vinyl polymers are preferable.

The water-insoluble vinyl polymer includes a copolymer prepared by polymerizing a monomer composition comprising a monomer having a salt-forming group (a) and a hydrophobic monomer (b). The monomer composition may contain a nonionic hydrophilic monomer (c) and/or a macromer (d) as occasion demands. It is preferable that the macromer (d) is contained in the monomer composition from the viewpoints of dispersion stability of the colorant in the ink and jetting stability of the ink.

As the monomer having a salt-forming group (a), the hydrophobic monomer (b) and the nonionic hydrophilic monomer (c), there can be exemplified the same monomers as those used for the above-mentioned water-soluble polymer.

The macromer (d) includes macromers such as monomers having a polymerizable unsaturated group and a number-average molecular weight of 500 to 100000, preferably 1000 to 10000. The number-average molecular weight of the macromer (d) is determined by gel chromatography using polystyrene as a standard substance and chloroform containing 1 mmol/L dodecylmethylamine as a solvent.

Representative examples of the macromer (d) include a silicone macromer and a styrenic macromer. Those macromers may be used alone or in admixture thereof.

Among the silicone macromers, a silicone macromer represented by the formula (I):

wherein $X^1$ is a polymerizable unsaturated group; $Y^1$ is a divalent group; each of $R^1$ is independently hydrogen atom, a lower alkyl group having 1 to 5 carbon atoms, an aryl group having 6 to 10 carbon atoms or an alkoxy group having 2 to 12 carbon atoms; $Z^1$ is a monovalent siloxane polymer residue having a number-average molecular weight of at least 500; q is 0 or 1; and r is an integer of 1 to 3, can be favorably used from the viewpoint of preventing scorching on the printer head of an inkjet printer.

In the silicone macromer represented by the formula (I), $X^1$ includes a monovalent unsaturated hydrocarbon group having 2 to 6 carbon atoms, such as $CH_2$=CH—group or $CH_2$=$C(CH_3)$—group. $Y^1$ includes a divalent group such as —COO—group, a —$COOC_{a1}H_{2a1}$—group wherein $a_1$ is an integer of 1 to 5, or phenylene group. Among them, —$COOC_3H_6$—is preferable. $R^1$ includes hydrogen atom; a lower alkyl group having 1 to 5 carbon atoms, such as methyl group or ethyl group; an aryl group having 6 to 20 carbon atoms, such as phenyl group; an alkoxy group having 1 to 20 carbon atoms, such as methoxy group; and the like. Among them, methyl group is preferable. $Z^1$ is preferably a monovalent dimethylsiloxane polymer residue having a number-average molecular weight of 500 to 5000. q is 0 or 1, and preferably 1. r is an integer of 1 to 3, and preferably 1.

Representative examples of the silicone macromer include a silicone macromer represented by the formula (I-1):

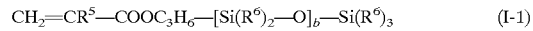

wherein $R^5$ is hydrogen atom or methyl group; each of $R^6$ is independently hydrogen atom or a lower alkyl group having 1 to 5 carbon atoms; and b is a number of 5 to 65;

a silicone macromer represented by the formula (I-2):

$$CH_2=CR^5-COO-[Si(R^6)_2-O]_b-Si(R^6)_3 \quad (I\text{-}2)$$

wherein $R^5$, $R^6$ and b are the same as defined above;

a silicone macromer represented by the formula (I-3):

$$CH_2=CR^5-Ph-[Si(R^6)_2-O]_b-Si(R^6)_3 \quad (I\text{-}3)$$

wherein Ph is phenylene group; and $R^5$, $R^6$ and b are the same as defined above;

a silicone macromer represented by the formula (I-4):

$$CH_2=CR^5-COOC_3H_6-Si(OE)_3 \quad (I\text{-}4)$$

wherein $R^5$ is the same as defined above; E is a group represented by the formula: $-[Si(R^5)_2O]_c-Si(R^5)_3$, wherein $R^5$ is the same as defined above, and c is a number of 5 to 65; and the like.

Among them, the silicone macromer represented by the formula (I-1) is preferable, and a silicone macromer represented by the formula (I-1a):

$$CH_2=C(CH_3)-COOC_3H_6-[Si(CH_3)_2-O]_d-Si(CH_3)_3 \quad (I\text{-}1a)$$

wherein d is a number of 8 to 40, is especially preferable. Examples of the silicone macromer include a silicone macromer commercially available from CHISSO CORPORATION under the trade name of FM-0711, and the like.

The styrenic macromer can be favorably used, from the viewpoint of sufficiently incorporating the pigment into the vinyl polymer.

Representative examples of the styrenic macromer include styrene homopolymers having a polymerizable functional group at one end, or copolymers of styrene with the other monomer. Among them, those having acryloyloxy group or methacryloyloxy group as a polymerizable functional group at one end are preferable.

It is desired that the content of styrene in the copolymer of styrene with the other monomer is at least 60% by weight, preferably at least 70% by weight, from the viewpoint of sufficiently incorporating the pigment into the vinyl polymer. The other monomer includes acrylonitrile, and the like.

It is desired that the content of the monomer having a salt-forming group (a) in the water-insoluble vinyl polymer is 1 to 50% by weight, preferably 2 to 40% by weight, from the viewpoint of dispersion stability of the resulting dispersion.

It is desired that the content of the hydrophobic monomer (b) in the water-insoluble vinyl polymer is 5 to 93% by weight, preferably 10 to 80% by weight, from the viewpoints of optical density and dispersion stability.

It is desired that the content of the nonionic hydrophilic monomer (c) in the water-insoluble vinyl polymer is 0 to 40% by weight, preferably 5 to 30% by weight, from the viewpoints of jetting stability and optical density.

It is desired that the content of the macromer (d) in the water-insoluble vinyl polymer is 0 to 30% by weight, preferably 1 to 25% by weight, more preferably 5 to 20% by weight, from the viewpoints of suppression of scorching on the heater surface of an inkjet printer and dispersion stability.

The weight-average molecular weight of the water-insoluble polymer is 1000 to 100000, preferably 1500 to 100000, more preferably 2000 to 70000, in consideration of influence on dispersion stability of the colorant and ink viscosity. The weight-average molecular weight of the water-insoluble polymer is determined in the same manner as the water-soluble polymer mentioned above.

It is preferable that the water-insoluble polymer is neutralized. The neutralization degree is not limited to specified ones as long as the dispersion stability is satisfactory. It is desired that 30 to 200% by mol of the neutralizing agent is usually added per 1 mol of the salt-forming group of the monomer having a salt-forming group (a), which constitutes the water-insoluble polymer.

The neutralizing agent used for neutralization can be appropriately selected depending upon the kind of the salt-forming group of the water-insoluble polymer. Examples of the neutralizing agent can be the same as those used for the water-soluble polymer.

It is desired that the amount of the water-insoluble polymer is 5 to 250 parts by weight, preferably 10 to 180 parts by weight, more preferably 15 to 130 parts by weight based on 100 parts by weight of the pigment or the hydrophobic dye, from the viewpoints of dispersion stability of the colorant in the ink, and a balance between jetting property, rubbing resistance and high-lighter fastness.

A preparation process in which the colorant is the above-mentioned aqueous dispersion (C) of water-insoluble polymer particles containing a pigment or a hydrophobic dye will be explained below.

The water-insoluble polymer can be prepared by polymerizing a monomer composition comprising the monomer having a salt-forming group (a) and the hydrophobic monomer (b), and if necessary, the nonionic hydrophilic monomer (c) and/or the macromer (d) by a polymerization method such as a bulk polymerization method, a solution polymerization method, a suspension polymerization method or an emulsion polymerization method. Among these polymerization methods, the solution polymerization method is preferable.

The solvent used in the solution polymerization method is preferably a polar organic solvent. When the polar organic solvent is a water-miscible organic solvent, the water-miscible organic solvent can also be used in admixture with water.

The polar organic solvent includes, for instance, aliphatic alcohols having 1 to 3 carbon atoms, such as methanol, ethanol and (iso)propanol; ketones such as acetone, methyl ethyl ketone and methyl isobutyl ketone; esters such as ethyl acetate; and the like. Among them, methanol, ethanol, acetone, methyl ethyl ketone or a mixed solvent thereof with water is preferable.

A radical polymerization initiator can be used in the polymerization. The radical polymerization initiator includes azo compounds such as 2,2'-azobisisobutyronitrile, 2,2'-azobis(2,4-dimethylvaleronitrile), dimethyl-2,2'-azobisbutyrate, 2,2'-azobis(2-methylbutyronitrile) and 1,1'-azobis(1-cyclohexanecarbonitrile); and organic peroxides such as t-butyl peroxyoctoate, di-t-butyl peroxide and dibenzoyl oxide.

It is desired that the amount of the polymerization initiator is 0.001 to 5 parts by weight, preferably 0.01 to 2 parts by weight, based on 100 parts by weight of the monomer composition.

In the polymerization, a polymerization chain transfer agent can be used. Concrete examples of the polymerization chain transfer agent include mercaptans such as octyl mercaptan, n-dodecyl mercaptan, t-dodecyl mercaptan, n-tetradecyl mercaptan and mercaptoethanol; xanthogenndisulfides such as dimethyl xanthogenndisulfide and diisopropyl xanthogenndisulfide; thiuram disulfides such as tetramethyl thiuram disulfide and tetrabutyl thiuram disulfide; halogenated hydrocarbons such as carbon tetrachloride and ethylene bromide; hydrocarbons such as pentaphenylethane; unsaturated cyclic hydrocarbon compounds such as acrolein, methacrolein, allyl alcohol, 2-ethylhexyl thioglycolate, terpinolene, α-terpinene, γ-terpinene, diterpene, α-methylstyrene dimer, 9,10-dihydroanthracene, 1,4-dihydronaphthalene, indene and 1,4-cyclohexadiene; unsaturated heterocyclic compounds such as 2,5-dihydrofuran; and the like. Those polymerization chain transfer agents can be used alone or in admixture of at least two kinds.

The conditions for polymerizing the monomer composition cannot be absolutely determined because the conditions differ depending upon kinds of the radical polymerization initiator, the monomers and the solvent used, and the like. The polymerization temperature is usually 30° to 100° C., preferably 50° to 80° C., and the polymerization time is usually 1 to 20 hours. It is preferable that the atmosphere for polymerization is an inert gas such as nitrogen gas.

After the termination of the polymerization reaction, the polymer can be isolated from the reaction solution by a known method such as re-precipitation or solvent distillation. Also, unreacted monomers and the like can be removed from the resulting copolymer to purify by the repeat of re-precipitation, or membrane separation, a chromatographic method, an extraction method or the like.

The aqueous dispersion of the polymer particles containing a hydrophobic dye can be prepared by a known emulsification method. The aqueous dispersion can be obtained, for instance, by dissolving the water-insoluble polymer and the hydrophobic dye in an organic solvent, adding a neutralizing agent as occasion demands to the resulting solution to ionize the salt-forming group of the water-insoluble polymer, adding water thereto, thereafter dispersing the resulting solution as occasion demands with a disperser or an ultrasonic emulsifier, and distilling off the organic solvent to phase-invert to a water-based system.

The aqueous dispersion of the water-insoluble polymer particles containing a pigment can be obtained, for instance, by dissolving the water-insoluble polymer in an organic solvent, adding the pigment, water and a neutralizing agent and a surfactant as occasion demands to the resulting solution, kneading the resulting mixture to give a paste, diluting the paste with water as occasion demands, and distilling off the organic solvent to give a water-based system.

It is desired that the content of the colorant in the ink is 0.5 to 30% by weight, preferably 1 to 20% by weight, more preferably 2 to 15% by weight, from the viewpoints of obtaining sufficient optical density and jetting property. When the colorant is a dispersion, the amount of the colorant is equal to the amount of solids contained in the dispersion.

There can be added to the ink, various additives, for instance, a wetting agent such as a polyhydric alcohol, a dispersant, a defoaming agent, a mildewproof agent and/or a chelating agent, a pH adjusting agent and the like in appropriate amounts.

EXAMPLES

Preparation Examples 1 to 4 (Preparation of Vinyl Polymer)

A reaction vessel was charged with 20 parts by weight of methyl ethyl ketone, and monomers and a polymerization chain transfer agent in the kinds and amounts listed in the column of "initially charged monomers" of Table 1, and nitrogen gas replacement was sufficiently carried out.

On the other hand, a dropping funnel was charged with monomers and a polymerization chain transfer agent in the kinds and amounts listed in the column of "dropping monomers" of Table 1, 60 parts by weight of methyl ethyl ketone and a solution prepared by dissolving 0.1 parts by weight of 2,2'-azobis(2,4-dimethylvaleronitrile) in 5 parts by weight of methyl ethyl ketone. The mixture in the dropping funnel was added dropwise to the mixture in the reaction vessel, and the resulting mixture was aged at 70° C. for 5 hours, and then at 75° C. for 10 hours to give a polymer solution.

A part of the resulting polymer solution was taken out from the reaction vessel, and its weight-average molecular weight was determined by gel permeation chromatography using polystyrene as a standard substance, and chloroform containing dodecyldimethylamine of 1 mmol/L as a solvent. As a result, the polymer had a weight-average molecular weight as shown in Table 1.

TABLE 1

| Prep. Ex. No. | Initially Charged Monomers | Dropping Monomers | Weight-Average Molecular Weight |
|---|---|---|---|
| 1 | Acrylic acid [13] Styrene [17] Mercaptoethanol [1.1] | Acrylic acid [14] Styrene [32.3] Mercaptoethanol [2.6] | 1700 |
| 2 | Methacrylic acid [5] 2-Hydroxyethyl Methacrylate [4] Styrene [19] Styrenic Macromer [4.3] Mercaptoethanol [0.7] | Methacrylic acid [8] 2-Hydroxyethyl Methacrylate [6] Styrene [29.5] Styrenic Macromer [2] Mercaptoethanol [1.5] | 16500 |
| 3 | Acrylic acid [4] Styrene [26.6] Silicone Macromer [8] Mercaptoethanol [0.9] | Acrylic acid [6] Styrene [31] Silicone Macromer [1.5] Mercaptoethanol [2.0] | 11500 |
| 4 | Dimethylaminoethyl Methacrylate [7] Monomethoxypolyethylene Glycol(n = 4) Methacrylate [7] Styrene [17.2] Styrenic Macromer [7] Dodecylmercaptan [0.8] | Dimethylaminoethyl Methacrylate [8] Monomethoxypolyethylene Glycol(n = 4) Methacrylate [5] Styrene [23.5] Styrenic Macromer [3] Dodecylmercaptan [1.5] | 31000 |

(Note)
The amount of each component inside parenthesis [ ] represents parts by weight.

Preparation Examples 5 to 12 (Preparation of Colorant for Pigment-Containing Ink)

A pigment, methyl ethyl ketone, ion-exchanged water and a neutralizing agent listed in Table 2 were added to 28 parts by weight of the polymer solution (solid content of the polymer: 50% by weight) obtained in Preparation Examples 1 to 4, and the resulting mixture was sufficiently stirred. Thereafter, the mixture was kneaded twenty times with a triple-roll mill commercially available from NORITAKE CO., LIMITED under the trade name of NR-84A.

The resulting paste was added to 250 parts by weight of ion-exchanged water, and the mixture was sufficiently stirred. Thereafter, methyl ethyl ketone and a part of water were distilled off using an evaporator, to give a colorant for an ink, the solid content of which was 20% by weight. The average particle diameter of the particles contained in the colorant for an ink is shown in Table 2.

The average particle diameter of the particles contained in the colorant was determined by cumulant analysis using a particle size distribution analyzer commercially available from Otsuka Denshi K.K. under the trade name of ELS-8000. As the determination conditions, the temperature of 25° C., the angle between the incident beam and a detector of 90° and the total integrated count of 100 counts were employed, and the refractive index (1.333) of water which was used as a dispersing solvent was inputted to the particle size distribution analyzer. As a standard substance, one commercially available from Seradyn under the trade name of Uniform Microparticles (particle diameter: 204 nm) was used.

The colorants obtained in Preparation Examples 5 and 6 are pigment-containing aqueous dispersions in which the pigment has been dispersed with a water-soluble polymer, since the pigment-containing aqueous dispersions obtained in Preparation Examples 5 and 6 exhibit water solubility when the acrylic acid moiety of the polymer was neutralized with a neutralizing agent in the amount shown in Table 2.

The colorants obtained in Preparation Examples 7 to 12 are aqueous dispersions of pigment-containing water-insoluble polymer particles, since the polymer exhibits water insolubility when the methacrylic acid moiety, the acrylic acid moiety and the dimethylaminoethyl methacrylate moiety contained in the polymer were neutralized with a neutralizing agent in the amount shown in Table 2.

Preparation Examples 13 and 14 (Preparation of Colorant for Hydrophobic Dye-Containing Ink)

A hydrophobic dye shown in Table 2 was added to 28 parts by weight of the polymer solution (solid content of polymer: 50% by weight) obtained in Preparation Example 2. After the hydrophobic dye was thoroughly dissolved in the polymer solution, a neutralizing agent shown in Table 2 was added thereto to neutralize a salt-forming group of the polymer. Two-hundred parts by weight of ion-exchanged water was further added thereto, and the mixture was stirred. Thereafter, the mixture was dispersed by Microfluidizer commercially available from Microfluidizer Corp. for 30 minutes.

Methyl ethyl ketone and a part of water were distilled off from the resulting dispersion with an evaporator, to give a colorant for an ink, the solid content of which was 20% by weight. The determination results of the average particle diameter of the particles contained in the colorant for an ink are shown in Table 2.

The colorants obtained in Preparation Examples 13 and 14 are aqueous dispersions of hydrophobic dye-containing water-insoluble polymer particles, since the polymer exhibits water insolubility when the methacrylic acid moiety of the polymer was neutralized with a neutralizing agent in the kind shown in Table 2.

Each name listed in Tables 1 and 2 means the followings:

Silicone macromer: commercially available from CHISSO CORPORATION under the trade name of FM-0711 (number-average molecular weight: 1000) [which has a structure represented by the formula (I-1a)]

Styrenic macromer: commercially available from TOAGOSEI CO., LTD. under the trade name of AS-6 (styrene homopolymerized macromer having a polymerizable functional group of methacryloyloxy group at one end, number-average molecular weight: 6000)

Monomethoxypolyethylene glycol(n=4) methacrylate: commercially available from Shin-Nakamura Chemical Co., Ltd. under the trade name of NK ESTER M-40G M-1: magenta pigment commercially available from DAINIPPON INK & CHEMICALS, INC. under the trade name of Fastogen Super Magenta RG Y-1: yellow pigment commercially available from SANYO COLOR WORKS, LTD. under the product number of 7410

C-1: cyan pigment commercially available from DAINIPPON INK & CHEMICALS, INC. under the trade name of Fastogen Blue TGR-SD Y-2: yellow pigment commercially available from Ciba Specialty Chemicals K.K. under the trade name of Yellow 8G-CF(K01)

C-2: cyan pigment commercially available from DAINIPPON INK & CHEMICALS, INC. under the trade name of Fastogen Blue TGR M-2: magenta dye commercially available from Orient Chemical Co., Ltd. under the trade name of Oil Pink 312

Y-3: yellow dye commercially available from Orient Chemical Co., Ltd. under the trade name of VALIFAST Y 1101

TABLE 2

| Prep. Ex. No. | Polymer | Dye/Pigment | Methyl Ethyl Ketone | Ion-Exchanged Water | Neutralizing Agent | Average Particle Diameter (nm) | Property of Polymer |
|---|---|---|---|---|---|---|---|
| 5 | Prep. Ex. 1 | C-1 [23] | [30] | [5] | 30% Aq. NaOH [7.0] | 128 | Water-Soluble after Neutralization |
| 6 | Prep. Ex. 1 | Y-1 [23] | [30] | [5] | 30% Aq. NaOH [7.0] | 71 | Water-Soluble after Neutralization |
| 7 | Prep. Ex. 2 | M-1 [23] | [30] | [5] | 30% Aq. NaOH [2.8] | 155 | Water-Insoluble after Neutralization |
| 8 | Prep. Ex. 2 | Y-1 [23] | [30] | [5] | 30% Aq. NaOH [2.8] | 70 | Water-Insoluble after Neutralization |
| 9 | Prep. Ex. 3 | C-2 [23] | [30] | [5] | 30% Aq. NaOH [2.6] | 82 | Water-Insoluble after Neutralization |
| 10 | Prep. Ex. 3 | M-1 [23] | [30] | [5] | 30% Aq. NaOH [2.6] | 173 | Water-Insoluble after Neutralization |
| 11 | Prep. Ex. 4 | Y-2 [23] | [30] | [5] | 30% Aq. NaOH [3.5] | 147 | Water-Insoluble after Neutralization |
| 12 | Prep. Ex. 4 | C-2 [23] | [30] | [5] | 30% Aq. AcOH [3.5] | 81 | Water-Insoluble after Neutralization |
| 13 | Prep. Ex. 2 | Y-3 [16] | [30] | [5] | 30% Aq. AcOH [7.0] | 58 | Water-Insoluble after Neutralization |
| 14 | Prep. Ex. 3 | M-2 [23] | [30] | [5] | 30% Aq. AcOH [2.8] | 170 | Water-Insoluble after Neutralization |

(Note)
The amount of each component inside parenthesis [ ] represents parts by weight.
*: AcOH means acetic acid.

Example 1

An ink composed of the following components was prepared by using the colorant shown in Table 3, and these inks were combined with each other to give an ink set. Each ink was prepared by mixing its components, and filtering with a microfilter having a pore size of 5 μm.

[Components of Ink]

| | (parts by weight) |
|---|---|
| Colorant (Solid Content of Colorant: 20% by weight) | 20 |
| Glycerol | 5 |
| Diethylene Glycol | 5 |
| Acetylene Glycol-Ethylene Oxide Adduct (Surfactant) [Commercially Available from Kawaken Fine Chemicals Co., Ltd. under the trade name of Acetylenol EH] | 3 |
| Ion-Exchanged Water | 67 |

Examples 2, 3 and 5 to 7 and Comparative Example 1

The same procedures as in Example 1 were carried out except that the colorant used in Example 1 was changed to the colorant shown in Table 3, to give an ink set.

Next, the physical properties of the ink sets obtained in Examples 1,2,3 and 5 to 7 and Comparative Example 1 were evaluated in accordance with the following methods. The results are shown in Table 3.

<Evaluation Methods>

(1) Jetting Property of Ink

An extent of distortion was observed with naked eyes when ruled lines were printed on a regenerated paper for PPC manufactured by Nippon Kako Seishi K.K. with a bubble jet printer commercially available from CANON INC. under the model number of "BJC-430J", and the jetting property was evaluated on the basis of the following evaluation criteria.

(Evaluation Criteria)
◎: No distortion
○: Little distortion
Δ: Some distortion
X: Much distortion or jetting failure due to nozzle clogging (2) Bleeding Resistance Solid image printing was carried out on a regenerated paper for PPC using the bubble jet printer mentioned in the above item (1) so that each of the inks was placed in adjacent to each other. The boundary portion of the resulting solid image was visually observed, and the bleeding resistance was evaluated on the basis of the following criteria:

(Evaluation Criteria)
◎: No bleeding is recognized at the boundary between inks
○: Slight bleeding is observed but not so conspicuous.
X: Terrible bleeding at the boundary between inks.

(3) Water Resistance

Solid image printing was carried out on a regenerated paper for PPC by using the above-mentioned bubble jet printer described in the above item (1), and dried at 25° C. for 1 hour. Thereafter, the initial optical density was determined. Further, the printed copy paper was immersed in stand-still water for 10 seconds, and the paper was vertically lifted therefrom. After drying the paper in the air at 25° C., the optical density after immersion was determined. The residual ratio of the optical density after immersion to the initial optical density was obtained by the equation:

[Residual Ratio]=[Optical Density after Immersion]÷[Initial Optical Density]×100.

The water resistance was evaluated on the basis of the following evaluation criteria:

(Evaluation Criteria)
◎: Residual ratio being at least 95%
○: Residual ratio being at least 90% and less than 95%
Δ: Residual ratio being at least 70% and less than 90%
X: Residual ratio being less than 70%.

(4) Rubbing Resistance

Solid image printing was carried out on a regenerated paper for PPC using the above-mentioned bubble jet printer described in the above item (1). After the paper was dried for 1 day at 25° C., the printed surface was strongly rubbed with a finger. The extent of rub-off of the printed image was observed with naked eyes, and evaluated on the basis of the following evaluation criteria:

(Evaluation Criteria)
◎: Substantially no printed image being rubbed off, and its periphery being not stained.
○: Some printed images being rubbed off, and its periphery being stained a little.
X: Printed images being considerably rubbed off, its periphery being drastically blacked, and finger also being considerably stained.

TABLE 3

| Ex. No. | Color | Colorant | Average Particle Diameter of Colorant (nm) | Difference of Particle Diameter (nm) | Jetting Property of Ink | Bleeding Resistance | Water Resistance | Rubbing Resistance | Number of Combination of Difference in Particle Diameter | Number of Combination of Lightness |
|---|---|---|---|---|---|---|---|---|---|---|
| 1 | C | Prep. Ex. 5 | 128 | 57 | ○ | ○ | ○ | ○ | 1 | 1 |
|   | Y | Prep. Ex. 6 | 71 |    | ○ |   | ○ | ○ |   |   |
| 2 | M | Prep. Ex. 7 | 155 | 85 | ◎ | ◎ | ◎ | ◎ | 1 | 1 |
|   | Y | Prep. Ex. 8 | 70 |    | ◎ |   | ◎ | ◎ |   |   |
| 3 | C | Prep. Ex. 9 | 82 | 91 | ◎ | ◎ | ◎ | ◎ | 1 | 0 |
|   | M | Prep. Ex. 10 | 173 |    | ○ |   | ◎ | ○ |   |   |
| 5 | Y | Prep. Ex. 13 | 58 | 112 | ◎ | ◎ | ◎ | ◎ | 1 | 1 |
|   | M | Prep. Ex. 14 | 170 |    | ○ |   | ◎ | ○ |   |   |

TABLE 3-continued

| Ex. No. | Color | Colorant | Average Particle Diameter of Colorant (nm) | Difference of Particle Diameter (nm) | Properties of Ink Set | | | | | |
|---|---|---|---|---|---|---|---|---|---|---|
| | | | | | Jetting Property of Ink | Bleeding Resistance | Water Resistance | Rubbing Resistance | Number of Combination of Difference in Particle Diameter | Number of Combination of Lightness |
| 6 | Y | Prep. Ex. 8 | 70 | Y/M: 85 | ◎ | Y/M: ◎ | ◎ | ◎ | 2 | 2 |
| | M | Prep. Ex. 7 | 155 | Y/C: 58 | ◎ | Y/C: ◯ | ◎ | ◎ | | |
| | C | Prep. Ex. 5 | 128 | M/C: 27 | ◯ | M/C: X | ◯ | ◯ | | |
| 7 | Y | Prep. Ex. 11 | 147 | Y/M: 8 | ◎ | Y/M: X | ◎ | ◎ | 2 | 1 |
| | M | Prep. Ex. 7 | 155 | Y/C: 66 | ◎ | Y/C: ◯ | ◎ | ◎ | | |
| | C | Prep. Ex. 12 | 81 | M/C: 74 | ◎ | M/C: ◎ | ◎ | ◎ | | |
| Comp. Ex. 1 | C | Prep. Ex. 5 | 128 | 19 | ◯ | X | ◯ | ◯ | 0 | 0 |
| | Y | Prep. Ex. 11 | 147 | | ◎ | | ◎ | ◎ | | |

It can be seen from the results shown in Table 3 that all of the ink sets obtained in each of Examples are excellent in jetting property and bleeding resistance, and also excellent in water resistance and rubbing resistance depending upon the kinds of the colorants.

As explained above, the ink set of the present invention is excellent in bleeding resistance, water resistance and rubbing resistance. The ink set of the present invention can be suitably used for inkjet recording because the ink set exhibits excellent jetting property without changing the printer head in accordance with the kinds of the inks.

What is claimed is:

1. An ink set, comprising:
   at least two color inks containing water-insoluble colorants for color inks having a different color with each other,
   wherein said ink set has at least one combination of two color inks satisfying that the difference in the average particle diameter of the particles contained in the water-insoluble colorant between these two color inks is 63 to 200 nm;
   wherein said ink set has comprises a color ink having a lower lightness and a color ink having a lightness higher than the color ink having a lower lightness, and
   wherein said ink set has at least one combination of two color inks satisfying that the average particle diameter of particles contained in the water-insoluble colorant used in the color ink having a lower lightness is larger than the average particle diameter of particles contained in the water-insoluble colorant used in the color ink having a lightness higher than the color ink having a lower lightness; and
   wherein the water-insoluble colorant is an aqueous dispersion of water-insoluble polymer particles containing a pigment or a hydrophobic dye.

2. The ink set according to claim 1, wherein the difference in the average particle diameter is 70 to 100 nm.

3. The ink set according to claim 1 or 2, wherein the ink set contains a yellow ink as a color ink, and the average particle diameter of particles contained in the water-insoluble colorant of the yellow ink is smallest in the particles contained in all of the water-insoluble colorants used in the ink set.

4. The ink set according to claim 1, wherein the average particle diameter of particles contained in the water-insoluble colorant is 10 to 200 nm.

5. The ink set according to claim 1, wherein the water-insoluble polymer particles comprise a water-insoluble vinyl polymer prepared by copolymerizing a monomer composition comprising a monomer having a salt-forming group, a hydrophobic monomer and a macromer.

6. The ink set according to claim 5, wherein said monomer having a salt-forming group is an unsaturated carboxylic acid monomer.

7. The ink set according to claim 5, wherein said monomer having a salt-forming group is a tertiary amine containing unsaturated monomer or an ammonium salt containing unsaturated monomer.

8. The ink set according to claim 5, wherein said hydrophobic monomer is selected from the group consisting of (meth)acrylates, styrenic monomers, and mixtures thereof.

9. The ink set according to claim 5, wherein said macromer has a polymerizable unsaturated group and a number-average molecular weight of 500 to 100000.

10. The ink set according to claim 5, wherein said macromer is selected from the group consisting of a silicone macromer, a styrenic macromer and mixtures thereof.

11. The ink set according to claim 5, wherein an amount of said monomer having a salt-forming group is 1 to 50% by weight, based on the weight of the water-insoluble vinyl polymer.

12. The ink set according to claim 5, wherein an amount of said hydrophobic monomer is 5 to 93% by weight, based on the weight of the water-insoluble vinyl polymer.

13. The ink set according to claim 5, wherein an amount of said macromer is 1 to 30% by weight, based on the weight of the water-insoluble vinyl polymer.

14. The ink set according to claim 5, wherein said water-insoluble vinyl polymer further comprises in copolymerized form a nonionic hydrophilic monomer.

15. The ink set according to claim 5, wherein said water-insoluble polymer has a weight average molecular weight of 1000 to 100000.

16. The ink set according to claim 1, wherein said hydrophobic dye dissolves in an organic solvent used for dissolving the water-insoluble polymer in an amount of at least 2 g/l at 25° C.

17. The ink set according to claim 1, wherein said water-insoluble polymer particles comprise a vinyl polymer.

18. The ink set according to claim 1, comprising 5 to 250 parts by weight of said water-insoluble polymer, based on 100 parts by weight of said hydrophobic dye.

* * * * *